US012634019B2

(12) United States Patent　　　　　(10) Patent No.: US 12,634,019 B2
Gebhart et al.　　　　　　　　　　　(45) Date of Patent:　　May 19, 2026

(54) ACOUSTIC TRANSMISSION SYSTEM, PRIMARY CIRCUIT, SECONDARY CIRCUIT, METHOD FOR TRANSMITTING AND USE OF AN ACOUSTIC TRANSMISSION SYSTEM

(71) Applicant: TDK Electronics AG, Munich (DE)

(72) Inventors: Michael Gebhart, Linz (AT); Renate Walter, Graz (AT)

(73) Assignee: TDK Electronics AG, Munich (DE)

( * ) Notice: Subject to any disclaimer, the term of this patent is extended or adjusted under 35 U.S.C. 154(b) by 143 days.

(21) Appl. No.: 17/642,180

(22) PCT Filed: Mar. 1, 2021

(86) PCT No.: PCT/EP2021/055037
　　§ 371 (c)(1),
　　(2) Date: Mar. 10, 2022

(87) PCT Pub. No.: WO2021/197735
　　PCT Pub. Date: Oct. 7, 2021

(65) Prior Publication Data
　　US 2022/0321237 A1　　Oct. 6, 2022

(30) Foreign Application Priority Data
　　Mar. 31, 2020　(DE) .......................... 102020108905.8

(51) Int. Cl.
　　*G10K 11/24*　　　(2006.01)
　　*H04B 5/45*　　　(2024.01)
　　　　　　(Continued)

(52) U.S. Cl.
　　CPC .............. *H04B 11/00* (2013.01); *G10K 11/24* (2013.01); *H04B 5/45* (2024.01); *H04B 5/73* (2024.01)

(58) Field of Classification Search
　　CPC . H04B 11/00; H04B 5/73; H04B 5/45; H04B 13/005; G10K 11/24; B06B 1/0607;
　　　　　　(Continued)

(56) References Cited

U.S. PATENT DOCUMENTS 5,018,114　A　*　5/1991　Mackelburg ........... H04B 11/00
　　　　　　　　　　　　　　367/134
5,594,705　A　　　1/1997　Connor et al.
　　　　　　(Continued)

FOREIGN PATENT DOCUMENTS

CN　　　　1217119　A　　5/1999
CN　　101557884　A　　10/2009
　　　　　　(Continued)

OTHER PUBLICATIONS

Md Rabiul Awal et al., "State-of-the-Art Developments of Acoustic Energy Transfer", International Journal of Antennas and Propagation, vol. 2016, Total pp. 15.
　　　　　　(Continued)

*Primary Examiner* — Daniel L Murphy
*Assistant Examiner* — Amie M Ndure
(74) *Attorney, Agent, or Firm* — Slater Matsil, LLP

(57)　　　　　ABSTRACT

In an embodiment an acoustic transmission system includes a primary side having a transmitting unit configured to provide a transmit signal, a receiving unit configured to receive a received signal in response to the transmitted signal and an electroacoustic transducer configured to convert the transmit signal into an acoustic signal and an acoustic signal into the receive signal and a secondary side having a transponder configured to receive a receive signal and transmit a transmit signal and an electroacoustic transducer located between the primary side and the secondary side, the electroacoustic transducer having a medium permeable to acoustic signals.

93 Claims, 7 Drawing Sheets

(51) Int. Cl.
　　*H04B 5/73* 　　　(2024.01)
　　*H04B 11/00* 　　(2006.01)
(58) Field of Classification Search
　　CPC ....... A61B 5/0071; A61B 5/01; A61B 5/0084;
　　　　　　A61B 5/11; A61B 5/0538; A61B 5/686;
　　　　　　A61B 5/017; A61B 5/0024; A61B
　　　　　5/0028; A61B 2560/0219; H02J 7/025;
　　　　　　　　　H02J 7/345; H02J 17/00
　　See application file for complete search history.

(56) References Cited

U.S. PATENT DOCUMENTS

| | | | |
|---|---|---|---|
| 5,861,018 A | 1/1999 | Feierbach | |
| 6,625,084 B1 | 9/2003 | Payton | |
| 7,606,530 B1 | 10/2009 | Anderson et al. | |
| 7,902,943 B2 | 3/2011 | Sherrit et al. | |
| 8,909,325 B2* | 12/2014 | Kimchy | A61B 5/415 |
| | | | 600/407 |
| 2002/0173720 A1* | 11/2002 | Seo | G01S 7/52074 |
| | | | 600/437 |
| 2003/0013958 A1* | 1/2003 | Govari | A61B 8/483 |
| | | | 600/443 |
| 2005/0036630 A1 | 2/2005 | Rein | |
| 2006/0009818 A1 | 1/2006 | Von Arx et al. | |
| 2006/0074319 A1* | 4/2006 | Barnes | A61B 5/06 |
| | | | 600/466 |
| 2007/0086274 A1 | 4/2007 | Nishimura et al. | |
| 2007/0167709 A1* | 7/2007 | Slayton | A61B 8/4263 |
| | | | 600/407 |
| 2007/0170815 A1 | 7/2007 | Unkrich | |
| 2008/0108901 A1* | 5/2008 | Baba | A61B 8/483 |
| | | | 600/459 |
| 2009/0247879 A1* | 10/2009 | Angelsen | G10K 11/34 |
| | | | 600/463 |
| 2010/0027379 A1 | 2/2010 | Saulnier et al. | |
| 2011/0121654 A1* | 5/2011 | Recker | H05B 45/3725 |
| | | | 307/64 |
| 2011/0205838 A1 | 8/2011 | Beckers et al. | |
| 2012/0127833 A1 | 5/2012 | Ghen et al. | |
| 2012/0182836 A1* | 7/2012 | Kwak | H04B 11/00 |
| | | | 367/118 |
| 2013/0177300 A1* | 7/2013 | Van Gestel | G11B 27/034 |
| | | | 386/326 |
| 2013/0230381 A1* | 9/2013 | Boehm | F04D 15/0088 |
| | | | 415/118 |
| 2014/0050321 A1* | 2/2014 | Albert | A61B 5/002 |
| | | | 367/137 |
| 2014/0276247 A1* | 9/2014 | Hall | A61N 5/0616 |
| | | | 604/20 |
| 2015/0049587 A1* | 2/2015 | Lawry | H04L 5/14 |
| | | | 367/87 |
| 2016/0045184 A1* | 2/2016 | Courtney | A61B 8/4494 |
| | | | 600/424 |
| 2016/0297671 A1 | 10/2016 | Pahl | |
| 2017/0125892 A1* | 5/2017 | Arbabian | A61B 5/0024 |
| 2017/0363581 A1* | 12/2017 | Makin | H02J 50/10 |
| 2018/0088220 A1 | 3/2018 | Flynn et al. | |
| 2018/0128785 A1 | 5/2018 | Vierkötter | |
| 2020/0264137 A1* | 8/2020 | Makin | H02J 50/80 |

FOREIGN PATENT DOCUMENTS

| | | | |
|---|---|---|---|
| CN | 101793965 A | 8/2010 | |
| CN | 102056324 A | 5/2011 | |
| CN | 102743255 A | 10/2012 | |
| CN | 104836629 A | 8/2015 | |
| CN | 105007572 A | 10/2015 | |
| CN | 105915481 A | 8/2016 | |
| CN | 107613877 A | 1/2018 | |
| CN | 107635910 A | 1/2018 | |
| CN | 108023548 A | 5/2018 | |
| CN | 108738160 A | 11/2018 | |
| CN | 109643378 A | 4/2019 | |
| DE | 102004014288 A1 | 10/2005 | |
| DE | 102010049138 A1 | 4/2012 | |
| DE | 102007038419 B4 | 8/2012 | |
| DE | 102016121105 A1 | 5/2018 | |
| DE | 102018113311 A1 | 12/2019 | |
| EP | 1771224 A1 | 4/2007 | |
| GB | 2498213 A | 7/2013 | |
| WO | 1999030266 A2 | 6/1999 | |
| WO | 2012141891 A1 | 10/2012 | |

OTHER PUBLICATIONS

Finkenzeller K., "Basics and practical applications of transponders, contactless smart cards and NFC," Hanser Fachbuchverlag, München, Sep. 2015, Total pp. 54.

Gebhart M., "Analytical considerations for an ISO/IEC14443 compliant SmartCard transponder", Proceedings of the 11th International Conference on Telecommunications, IEEE, 2011, Total pp. 8.

Gebhart M., "Active Load Modulation for Contactless Near-Field Communication", International Conference on RFID—Technologies and Applications (RFID-TA), IEEE, 2012, Total pp. 6.

Gebhart M., "Automated Antenna Impedance Adjustment for Near Field Communication (NFC)", Proceedings of the 12th International Conference on Telecommunications, IEEE, 2013, Total pp. 8.

ISO/ IEC FDIS 14443-1, "Contactless integrated circuit(s) cards—Proximity cards", Jan. 13, 2000, Total pp. 10.

ISO/IEC JTC 1/SC 17, "Identification cards—Test methods—Part 6: Proximity cards", Aug. 9, 2000, Total pp. 30.

Schober A., "An NFC Air Interface coupling model for Contactless System Performance estimation", Proceedings of the 12th International Conference on Telecommunications, 2013, Total pp. 8.

Bao X., et al., "Wireless piezoelectric acoustic-electric power feedthru" Sensors and Smart Structures Technologies for Civil, Mechanical, and Aerospace Systems, Apr. 2007, vol. 6529, Total pp. 8.

Yang D., et al., "Through-Metal-Wall Power Delivery and Data Transmission for Enclosed Sonsors: A Review", Sensors, 2015, vol. 15, Issue 12, pp. 31581-31605, Total pp. 25.

* cited by examiner

ACOUSTIC TRANSMISSION SYSTEM, PRIMARY CIRCUIT, SECONDARY CIRCUIT, METHOD FOR TRANSMITTING AND USE OF AN ACOUSTIC TRANSMISSION SYSTEM

This patent application is a national phase filing under section 371 of PCT/EP2021/055037, filed Mar. 1, 2021, which claims the priority of German patent application 102020108905.8, filed Mar. 31, 2020, each of which is incorporated herein by reference in its entirety.

TECHNICAL FIELD

The invention relates to the transmission of energy and/or information across a hermetic and/or galvanic barrier. In particular, the invention relates to the associated transmission system operating with acoustic waves, the primary circuitry thereto, the secondary circuitry thereto, methods for transmitting information and/or energy across the barrier, and the use of a corresponding acoustic transmission system.

BACKGROUND

There exists a need to be able to sense and control industrial processes. The detection and control of processes that are difficult for conventional measurement technology to detect is problematic. These include examples from industry, aviation, shipping and other fields where the space to be measured, which determines the corresponding parameters to be measured, is delimited by a barrier. Barriers can be pressure vessels or generally enclosed structures. Particularly problematic are barriers that are hermetically sealed and/or intransparent to electromagnetic waves.

Especially problematic are barriers in which no hole can or should be drilled through which a sensor can be introduced into the space to be measured.

It is known that acoustic waves can pass through such barriers. For example, electroacoustic transducers are known from U.S. Pat. No. 5,594,705. Corresponding transmission arrangements are described, for example, in the review article by Ding-Xin Yang, Zheng Hu, Hong Zhao, Hai-Feng Hu, Yun-Zhe Sun and Bao-Jian Hou: "Through-Metal-Wall Power Delivery and Data Transmission for Enclosed Sensors: A Review" in Sensors 2015, 15, 31581-31605, https://www.ncbi.nlm.nih.gov/pmc/articles/PMC4721790/. From the paper "State-of-the-Art Developments of Acoustic Energy Transfer" (Md Rabiul Awal, Muzammil Jusoh, Thennarasan Sabapathy, Muhammad Ramlee Kamarudin, and Rosemizi Abd Rahim; International Journal of Antennas and Propagation, Volume 2016, Article ID 3072528, Hindawi Publishing Corporation, https://www.researchgate.net/publication/307893860_State-of-the-Art_Developments_of_Acoustic_Energy_Transfer), the use of acoustic waves for power transmission is known. From patent DE 102007038419 B4, for example, a sensor system inside a metallic housing is known, which can be supplied with energy from outside by means of ultrasound and the sensor data can also be transmitted by means of ultrasound.

SUMMARY OF THE INVENTION

Embodiments provide transmission systems that can overcome corresponding barriers without affecting the functionality of the barrier.

The transmission system has on a primary side a transmitting unit, a receiving unit and an electroacoustic transducer. The transmitting unit is provided for and adapted to provide a transmitting signal. The receiving unit is provided for and adapted to receive a received signal in response to the transmitted signal. The electroacoustic transducer is provided for and adapted to convert the transmit signal into an acoustic signal and an acoustic signal into a receive signal. Further, the transmission system has a transponder and an electroacoustic transducer on a secondary side. The transponder is designed and adapted to receive a receive signal and transmit a transmit signal. The electroacoustic transducer of the secondary side can thereby make acoustic contact with the electroacoustic transducer of the primary side. Further, the acoustic transmission system has a medium between the primary side and the secondary side that is permeable to acoustic signals.

In essence, the medium represents the barrier that must be overcome if information is to be exchanged between the sides of the barrier. The barrier may be opaque to electromagnetic waves and hermetically separate the outside from the inside. Either of the two electroacoustic transducers of the transmission system may be a piezoelectric transducer. A piezoelectric transducer may include a piezoelectric element and electrode structures. Using the piezoelectric effect, the piezoelectric element converts between alternating electrical and acoustic signals. Transducers that operate with longitudinal acoustic waves typically have a sandwich structure in which the piezoelectric material is sandwiched between a lower electrode and an upper electrode. Together with an appropriate acoustic termination, the corresponding electroacoustic transducer can operate as an electroacoustic resonator.

It is possible that the transmission system comprises a sensor on the secondary side.

The sensor may be a temperature sensor, pressure sensor, humidity sensor, gas sensor, light sensor, pulse counter, microphone, or a sensor of a similar type. In particular, the sensor may be a micro electromechanical system (MEMS) sensor. Such sensors are inexpensive to produce in large numbers, have good electrical characteristics and signal-to-noise ratio, and have low power consumption.

It is possible for the transmission system to include a logic circuit on the secondary side.

The logic circuit may be interconnected to the sensor, drive and read the sensor, and provide any necessary bias voltages to the sensor. The logic circuit can detect the sensor signal in the process. The sensor signal is usually an analog sensor signal. Accordingly—if a digital output signal is desired—the logic circuit may include an A/D converter and/or amplify the strength of the sensor output signal.

To communicate with the primary, the secondary of the transmission system may include a modulator. For example, the modulator may comprise a metal oxide semiconductor field effect transistor (MOSFET). By means of the modulator, a signal can be encoded in such a way that the secondary side informs the primary side, for example, about corresponding sensor readings.

The modulation can be an amplitude modulation, a frequency modulation, a phase modulation or a complex modulation combining different modulation forms mentioned above. Switching on or off an amplitude for the return response to the primary side is a special form of amplitude modulation in this case.

It is possible that the secondary side accordingly has a modulator for modulating the electrical load at the secondary-side electroacoustic transducer.

Modulating the electrical load at the secondary-side electroacoustic transducer represents a preferred embodiment, since this can be implemented as a particularly energysaving circuit. An electrical load is connected to the secondary-side electroacoustic transducer, the impedance of which can be varied by the modulator. If the secondary side, i.e. the electroacoustic resonator on the secondary side receives acoustic waves from the primary side that have passed through the barrier, the electroacoustic transducer on the secondary side converts the acoustic signals into electrical signals. These electrical signals are applied to the electrical load on the secondary side. The system consisting of the electroacoustic transducer on the secondary side and the electrical load of adjustable impedance connected to it represents a reflection element for acoustic waves whose reflection coefficient can be adjusted by setting the electrical load. Thus, a modulation of the electrical load at the secondary-side electroacoustic resonator causes a modulation of the reflection factor for the acoustic waves. On the primary side, modulated acoustic waves can then be received according to the modulation of the reflection factor and evaluated accordingly.

The modulation of the electrical load to modulate the reflection factor does not require any special excitation of waves on the secondary side of the transmission system for this purpose, so that on the secondary side the corresponding energy consumption for communication with the primary side is minimal.

The energy consumption on the secondary side can even be so low that energy transporting the acoustic waves from the primary side to the secondary side is sufficient to supply the secondary side circuit elements with energy. Electrical energy can thereby be easily obtained by the electroacoustic transducer from the acoustic energy from the primary side.

For this purpose, it is possible that the transmission system has a rectifier on the secondary side that provides corresponding output currents and output voltages at the secondary-side electroacoustic transducer—with capacitors for smoothing, if necessary—as secondary-side DC voltage.

It is possible that the rectifier is connected between the electroacoustic converter and the modulator. Alternatively, or in addition, it is possible that the rectifier is directly connected to the modulator.

Arranging the modulator, e.g. in the form of a MOSFET transistor—directly behind the rectifier, in contrast to the circuits of U.S. Pat. No. 5,594,705, has the advantage that an incoming carrier frequency from the primary side is not reduced to 0 volts by the e.g. digitally switched modulator, e.g. transistor, during load modulation, because a small voltage drop results at the rectifier. This remaining carrier frequency voltage, which may be on the order of 100 mV, for example, can be used by the secondary-side circuitry to maintain a clock signal on the secondary-side circuitry even during this period of communication.

It is possible that the transmission system comprises a transistor whose base is connected to a terminal for load modulation.

It is possible that the transistor is the MOSFET mentioned above.

It is possible that the transmission system comprises a rectifier, for example the rectifier mentioned above, between an electroacoustic transducer and the transistor. This makes it possible that when the transistor is short-circuited, the voltage across the electroacoustic transducer does not become zero during load modulation.

It is thus possible, even during modulation, to derive the clock on the secondary side from an incoming acoustic wave having the carrier frequency primary side.

It is possible for the transmission system to include an intermediate energy storage device on the secondary side.

The intermediate energy storage may comprise a capacitor and/or an accumulator. In this context, the intermediate energy storage can store energy that is required for less frequent measurement processes. For example, measurement processes that use an are between two electrodes are possible. According to the energy transmitted from the primary side that is available for measurements on the secondary side and the frequency at which measurements are to be made on the secondary side, the available energy per measurement process is essentially predetermined.

It is possible that the transponder is intended and suitable to use the clock of the receiving system as system clock. In this case, the receiving system receives the clock of the acoustic waves transmitted by the primary side to the secondary side via the barrier.

Unlike conventional information transmission systems, the secondary side thus does not need its own oscillator as a clock for digital circuits. This in turn can save energy, which is available for measurement processes.

Accordingly, it is possible for the secondary side to be free of an oscillator for back communication.

Furthermore, it is even possible that the secondary side is free of an oscillator as a clock generator at all, since the clock of the signal received from the primary side can also be used for other circuit components on the secondary side.

It is possible that the transmission system on the secondary side comprises an electrical impedance matching network.

In this case, the electrical impedance matching network is used to match the electrical impedance between the output impedance of the electroacoustic transducer on the secondary side and the other circuit components on the secondary side.

The impedance matching network may comprise suitably connected capacitive, inductive and resistive circuit elements.

It is possible for the transmission system to include a frequency reducer on the secondary side.

Frequency reducers may be circuits that convert a signal having an input frequency into an output signal having an output frequency that is different from the frequency of the input signal.

Back communication with the primary side can thereby be based essentially on the reduced frequency as the carrier frequency. On the primary side, the response signal can thus be easily separated from the primary signal and evaluated by means of a crossover.

In particular, a frequency halver or a cascade of frequency halvers can be used as a frequency reducer. For example, a sequence of one, two, three, or four frequency halvers results in a halving, quartering, eighth, or sixteenth, respectively, of the frequency of the carrier signal from the primary. If the reduced frequency is sufficiently different from the primary frequency, the crossover on the primary side can separate even if the intensity of the response from the secondary side is greatly attenuated.

It is possible that the transmission system on the secondary side includes a circuit unit with a transformer and a parallel circuit with an inductive element, a capacitive element and a logic circuit.

The inductive element and the capacitive element may thereby provide electrical impedance matching, possibly in conjunction with the transformer.

The logic circuit is used to drive the sensor and, if necessary, to modulate the signal for response back to the primary.

It is possible for the transmission system to include, on the secondary side, a logic circuit front-end circuit having a port, a supply terminal, four circuit nodes A, B, C, D and an operational amplifier, and seven transistors.

These circuit components may thereby represent the circuit components of an integrated circuit as a version of a transponder circuit for load modulation, with one of the transistors in particular performing the actual load modulation.

It is possible that acoustic impedance matching and/or electrical impedance matching takes place on the primary side and/or on the secondary side, and the associated means are provided for this purpose.

In particular, it is possible that only on the primary side only electrical impedance matching takes place. Further, it is possible that only on the secondary side only electrical impedance matching takes place. Furthermore, it is possible that only on the primary side or only on the secondary side an acoustic impedance matching takes place.

However, it is also possible and advantageous for both the primary side and the secondary side to have electrical impedance matching. Accordingly, it is also advantageous if both the primary side and the secondary side have acoustic impedance matching.

Electrical impedance matching can be performed using the electrical circuit networks commonly used for this purpose with active or passive circuit elements such as capacitive elements, inductive elements or resistive elements. Acoustic impedance matching is possible using additional layers with matched acoustic impedance. For example, an additional layer can be arranged between the primary-side electroacoustic transducer and the barrier material or between the barrier material and the secondary-side electroacoustic transducer.

In an advantageous embodiment, the corresponding electroacoustic transducers are mechanically bonded to the barrier by means of an adhesion promoting layer, e.g. a suitable adhesive, wherein the adhesion promoting layer has a suitable acoustic impedance, or a layer thickness that is as thin as possible.

Furthermore, it is possible for the primary side to have a crossover in accordance with the above.

The crossover can thereby serve to decouple a return response from the secondary side on the side of the primary side from the primary carrier signal and to evaluate it undisturbed by the strength of the primary signal.

In this case, the crossover can preferably comprise a diplexer or a duplexer. In the equally possible case that the secondary side does not comprise a frequency reducer but a frequency enhancer, e.g. one or more frequency doublers, the primary side can also decouple and evaluate signals with frequencies above the frequency of the primary signal.

It is further possible that in the transmission system, the primary side is provided and suitable for continuously supplying energy to the secondary side. In this case, the energy is preferably transmitted through the barrier in the form of acoustic energy and converted into electrical energy on the secondary side, for example by means of the electroacoustic transducer.

It is possible that the communication is only unidirectional from the secondary side to the primary side. In this case, the primary side only transmits energy to the secondary side.

However, it is advantageous if the transmission system is provided and suitable for bidirectional communication. Then the primary side can transmit information to the secondary side. The secondary side can receive and evaluate the information. Further, the secondary side may transmit information to the primary side and the primary side may evaluate the received information.

Furthermore, it is possible that the transmission system has a matching network on the primary side and the matching network comprises two signal lines, a balanced guided signal input, an unbalanced guided signal output, a supply connection, three inductive elements and 6 capacitive elements.

Via the balanced guided signal input, the matching network can receive information from an external circuit environment. Via the unbalanced guided output, the matching network of the primary side can forward correspondingly received information to the external circuit environment.

In balanced guided signal lines, there are two conductor elements that transmit the same signal with opposite amplitude. Balanced guided signal lines are relatively insensitive to common mode noise.

As an application on the "inner" (secondary) side in the transmission system, means for recording and transmitting audiovisual perception (for example, audio recording, image recording, video recording, image-and-sound recording— i.e., a "classic" video camera, for example) can also be included.

These can be operated with the help of the "harvested" energy (from the introduced signal of the primary side, e.g. an ultrasonic signal, as already described for the other sensors as described above).

The data recorded in the interior—e.g. sound, image, video, sound-image-video—can subsequently be transmitted in the form of digital data as useful data in the described transmission system via acoustic waves again to the "outside", i.e. to the primary side.

Basically, data can be transmitted in monochrome, grayscale orb color image can be transmitted.

For audio, mono or stereo can be selected.

In other words, any type of transmission can be selected that is generally used for such things.

Overall, what one selects in concreto is limited only by bandwidth and transmission rate.

What is essential, however, especially for the transmission of an image or moving image, is a mechanism which transmits the start of a new image or the start of a new image line (in the case of scanning in dots and lines) to the primary side, in order to ensure successful displayability of the transmitted image, etc.

As a further complexity, for a color image, usually 3 values or data vectors can be transmitted per pixel (red, green, blue). This information must be well adapted to the data frame sizes provided in the hardware.

It is especially possible that the hardware supports e.g. 64 bytes large data frames, which on the one hand can be filled with processed image data, and on the other hand these data frames can be passed on to the outside via the medium between the secondary side and the primary side.

The circuitry of the primary side may be designed as a detachable or transportable module or may include a detachable module. The module may include an NFC antenna and/or a piezoelectric transducer element.

In this way, an NFC interface, e.g. of a cell phone, can be used to control or operate the application on the secondary side via acoustic waves.

That is, the transmission system can include or is easily expandable by another air interface.

Thus, the transmission system can also be controlled by a "relay" consisting of a transceiver of any wireless standard (e.g., Bluetooth) and a piezoelectric transducer element, as well as an energy storage device (battery or rechargeable battery) and electronics suitable to converting the data between the different standards, can be extended or expandable.

A primary circuit, such as a primary circuit of a transmission system, may include the elements of the primary as described above. Accordingly, a secondary circuit may comprise elements on the secondary side of the transmission system as described above.

A method of transmitting by means of an acoustic transmission system may comprise the following steps:

Transmitting, by means of a transmitting unit on a primary side, a carrier signal to a receiving unit on a secondary side;

Receiving, by the receiving unit, the carrier signal;

Generating a response signal based on a measured value;

Transmitting the response signal to the primary side.

It is further possible that the communication further includes steps of identifying the secondary. The identification may be based on a measured value. It is also possible that the identification uses other, e.g., additional, information. The system for identification may also comprise several secondaries.

For this purpose, it is possible that the primary continuously emits a sinusoidal signal at or near the carrier frequency. That sinusoidal signal may serve the secondary to continuously draw electrical power and maintain operation from a volatile storage. Further, it is possible for the primary to sporadically modulate this continuous sinusoidal signal to transmit commands and/or values for identification.

The secondary side, on the other hand, may typically provide some load impedance to the converter on a continuous basis. The load impedance is then sporadically modulated for the purpose of data transmission.

The change in (electrical) load on the secondary side piezo transducer can cause a change in (electrical) impedance on the primary side piezo transducer, so that the modulation of the secondary side can be seen on the primary side.

Advantageously, this modulation at the secondary side can also be carried out in such a way that (on the secondary side) electrical power can nevertheless be continuously obtained from the carrier sinusoidal signal generated by the primary side.

The primary side can generate a continuous sinusoidal signal for the load modulation, which allows the change of the terminal impedance at the primary side piezo transducer to be detected or measured continuously as well.

It is possible that the primary side signal source is a current source. The change of an electrical load resistance at the current source will then lead to a change of the voltage applied to the load resistance. This voltage can be measured and (the modulation and channel coding of the data therein) evaluated by the reader (i.e., the primary side reading in acoustic response signals from the secondary side for evaluation).

It is possible that the primary side and the secondary side are hermetically separated and/or separated by a barrier that is impenetrable to electromagnetic signals.

It is possible that acoustic waves penetrate a barrier between the primary side and the secondary side and transmit information and/or energy.

Furthermore, it is possible that communication between the primary side and the secondary side and/or between the secondary side and the primary side is encrypted point-to-point.

Common encryption methods can be considered as encryption methods. Thus, point-to-point encryption is possible. In any case, this can be implemented as an additional security feature.

It is possible that the communication uses a cryptographic method.

This allows the content of the communication to be inaccessible to a third party and/or to be modified by a third party in a non-targeted manner. This distinguishes encryption from procedures for detecting transmission errors.

However, the data transmission itself may further have the possibility of detecting transmission errors built in. E.g., by a mechanism using parity bits and/or the possibility of detecting and/or correcting individual transmission errors in a data frame, e.g., by the mechanism of a cyclic redundancy check, CRC, e.g., CRC16 or CRC32.

Encryption of data and/or error protection and/or error detection represent different aspects and are possible individually or in combination.

It is possible that communication takes place in one or both directions via digital signals.

It is possible that the communication is unidirectional or bidirectional.

In the case of bidirectional communication, this can take place simultaneously (full duplex, e.g. frequency duplex, FDD), and/or one after the other in time with defined times without communication in between (half duplex, e.g. time duplex, TDD).

It is possible that the information is transmitted by means of modulation and the modulation is selected from load modulation, amplitude modulation, phase modulation, frequency modulation and a complex modulation with a mixed form of the of two or more of the above modulations.

In particular, it is possible for the modulation to apply to the data flow direction from the primary side to the secondary side.

It is possible that the modulation may be any one of the modulations of sections 8 and 9 of ISO/IEC14443-2_2010 (i.e., ISO/IEC14443-2 as amended in 2010).

Further, it is possible that the information transmission method uses error detection or error correction methods.

In particular, it is possible that data packets, e.g. data frames, are sent from the primary side to the secondary side on demand and are answered by the secondary side-correspondingly also merely on demand.

It is possible that between such asynchronous data frames only the non-modulated carrier frequency is sent from the primary side to the secondary side, i.e. that the time in between remains free of data frames.

Further, it is possible that a parity bit is sent between 8 bits of user data in accordance with the ISO/IEC14443-3_2011 standard (i.e., the ISO/IEC14443-2 standard as amended in 2011).

Furthermore, it is possible that the transmission uses a Cyclic Redundancy Check (CRC) mechanism.

The Cyclic Redundancy Check (CRC) can be a CRC16 check or CRC32 check according to the ISO/IEC14443-3_2011 standard. The last 2×8 bits or 4×8 bits belong to the check.

It is possible that energy is temporarily stored on the secondary side, which the secondary side has received from the primary side.

It is possible that acoustic waves traversing the solid barrier are used for communication at least through the barrier.

It is possible that the communication is controlled by the primary side. This can also be described as the "primary side talks first" principle.

It is possible that a primary side communicates with more than one secondary side. Thus, it is possible that beyond the barrier, multiple sensors each have their own power and information receiving and transmitting systems and communicate with a primary side.

To this end, it is possible that the method employs anti-collision methods to avoid signal overlap between the different secondary sides.

It is possible that acoustic signals with frequencies in the range between 1 MHz and 50 MHz are used for communication.

Preferred frequencies result from the geometry and materials used in the barrier and the corresponding acoustic impedances of the materials used.

It has been shown that barrier thicknesses of 4 mm and a barrier material made of metal with a density of 7890 kg/m3 and a sound velocity of 5970 m/s are sufficient for frequencies of 9.4 MHz, 9.9 to 10.1 MHz and 10.7 MHz for successful communication.

In principle, on the one hand, frequency bands with narrow but sufficiently wide usable frequency ranges result from resonances determined by the thickness of the metal plate.

On the other hand, a frequency band with a relatively wide usable frequency range results from a resonance determined by the dimensions of the acoustic transducer of the primary side, e.g. the thickness of the piezoelectric disk.

The way the piezoelectric disk is attached, e.g., glued, also enters here.

This wider frequency range can be used in an advantageous way because a certain bandwidth is needed to transmit the modulation signal of the reader, and narrower bandwidth distorts signals more. The wider passband also allows a shift in resonant frequencies with temperature, and thus scatter in production, to be tolerated without special countermeasures. This is a cost advantage.

The thickness of an adhesive, especially the average thickness, between electroacoustic transducer and barrier can be about 10 μm thick. The electroacoustic transducers may have a length of 205 μm as seen in the propagation direction of the acoustic waves.

Preferably, the thickness of the adhesive is distributed as homogeneously as possible over the bonding surface. However, the transmission channel is shown to be sufficiently stable so that inhomogeneities can be tolerated. In fact, it even shows that there may be places where the piezoelectric disk directly contacts the acoustic medium.

Furthermore, the thinner the adhesive layer, the lower the acoustic losses.

Thus, it is also possible and even advantageous to attach the transducer directly to the material of the medium—e.g. by pressing it on.

It is further possible and advantageous for the electroacoustic communication to use a frequency range around the NFC frequency 13.56 MHz, e.g., the frequency range 13.56 MHz f 0.5 MHz.

In this context, it is advantageous if the elements of the acoustic channel between the primary side and the secondary side are adapted to the frequency range 13.56 MHz 0.5 MHz.

In this context, the elements of the acoustic channel may in particular comprise the electroacoustic transducers, adhesive layers and the medium.

It is possible that the method of communication involves regular variation of carrier frequencies and/or amplitudes, for example, to compensate for changes in environmental parameters, e.g., temperature, expansion, pressure, etc., or manufacturing tolerances. In particular, it is possible for the primary side to inform the secondary side of varied beneficial frequencies.

In this context, it is possible that the varying of frequencies is based on received digital data that the primary side receives from the secondary side.

In this case, the secondary side first correctly receives a command from the primary side.

The secondary side can then subsequently inform the primary side about "good" or "bad" frequencies.

The division into "good" and "bad" frequencies can be based on the bit error rate.

This is advantageous because no additional analog circuit elements are then required for the division into "good" and "bad" frequencies and, in particular, no evaluation of the amplitude level is necessary.

A corresponding acoustic transmission system can be used to interrogate one or more measured values in a volume that is hermetically separated from the primary side and/or separated by a non-transparent barrier.

The system may be used to measure temperature, gas pressure, and/or humidity.

Specifically, the system may be used in a high voltage capacitor for galvanically isolated transmission to the outside.

It is further possible to use an error detection mechanism in the transmission system to find well-suited carrier frequencies, amplitudes, and/or settings of a modulation.

In this regard, an error detection mechanism or a corresponding error detection method may determine an error rate while varying one or, e.g., successively, several transmission parameters. A parameter combination with an error rate below a predetermined threshold can then be used as the parameter combination for the actual work of the system.

It is possible that the secondary side detects transmission errors in the command sent by the primary side. The secondary side transmits this information back to the reader via the acoustic channel. The reader can recognize favorable values, store them locally e.g. as a table, and use them as settings if required.

Of course, it is also possible to detect errors in the transmitted information of the secondary side and to react to them.

It is important that the primary side has this information, since preferably it controls the flow of the communication and can preset values for the carrier frequency and other parameters.

This would also be possible for continuous monitoring of the communication, e.g. for dynamically checking whether other parameters are even more beneficial in the meantime.

It is possible that in an acoustic transmission system four or more acoustic frequency ranges are used in which the same information is transmitted.

This improves the immunity to interference (e.g. in the case of interference by noise in the metal or interference by pronounced resonances in the metal, which statistically tend to occur in only one frequency range).

This is given e.g. by the use of a load modulation with subcarrier.

It is possible to use a two-stage modulation method for the load modulation.

In a first step, data can be modulated onto a subcarrier, e.g. in Manchester coding, and then the subcarrier in the channel can be modulated onto the carrier frequency in a second step.

Furthermore, it is possible for the primary to always receive the information from the secondary at the same time and in parallel in four frequency bands, but fixed relative to the carrier.

Thus, it is possible that the information is always transmitted simultaneously in four frequency bands.

BRIEF DESCRIPTION OF THE DRAWINGS

Central aspects of the described devices on the primary side, on the secondary side and of the corresponding system as well as of operating methods and details of preferred embodiments are explained in more detail in the schematic figures.

DETAILED DESCRIPTION OF ILLUSTRATIVE EMBODIMENTS

Figure 1:
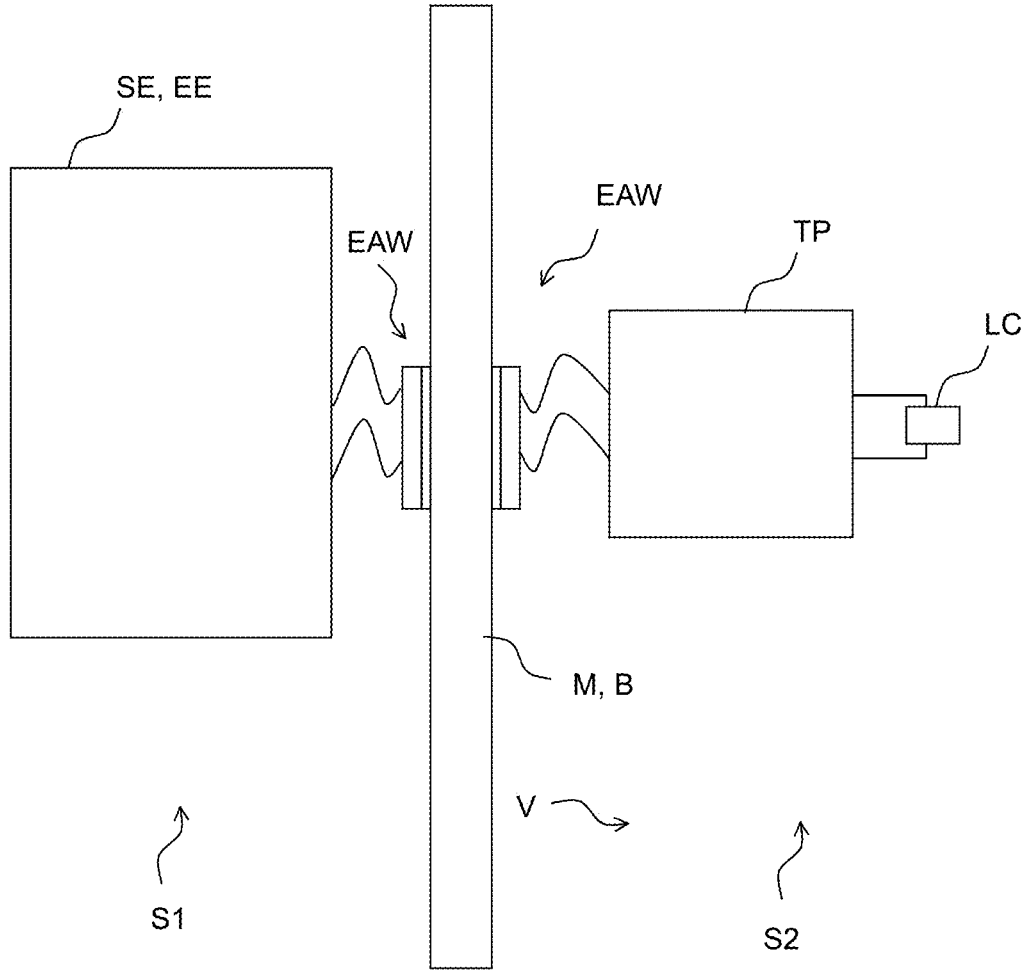
FIG. 1 shows an overview of important elements of the transmission system.

FIG. 1 shows a barrier B separating a volume V on the secondary side S2 from the primary side S1. If the volume V on the secondary side S2 is hermetically separated and the barrier B is intransparent for electromagnetic and possibly magnetic signals, then usual communication paths between the primary side and the secondary side fail if a sensor for measuring a parameter is present on the secondary side and its signal is to be evaluated on the primary side S1.

However, it is possible to use the material of the barrier B as a medium M for acoustic waves to exchange information between the primary side S1 and the secondary side S2.

For this purpose, the transmission system has an electroacoustic transducer EAW on the primary side S1 and a second electroacoustic transducer EAW on the secondary side S2. Both electroacoustic transducers EAW are directly connected—e.g. by means of an adhesive—to the medium M of the barrier B. The electroacoustic transducers EAW are connected to the medium M of the barrier B by means of an adhesive. Sound waves emitted by the electroacoustic transducer EAW on the primary side S1 in the direction of the medium M can be received on the secondary side by the electroacoustic transducer EAW on the secondary side. The possibility of the electroacoustic transducers to convert between electrical signals and acoustic signals thus results in the possibility to use electrical signals on both sides of the barrier B and to use acoustic signals only for the transport of information across the barrier B. The transmission of acoustic signals also enables the simultaneous transmission of energy, so that the secondary side S2 can be supplied with energy from the primary side S1.

On the primary side S1 are a transmitting unit SE and a receiving unit EE. A transponder TP is arranged on the secondary side. The transponder TP is used for communication with the primary side S1 and serves as an interface between the electroacoustic transducer EAW on the secondary side and a logic circuit LC on the secondary side. The logic circuit LC on the secondary side can be used to control a sensor and to process the sensor signal.

Figure 2:
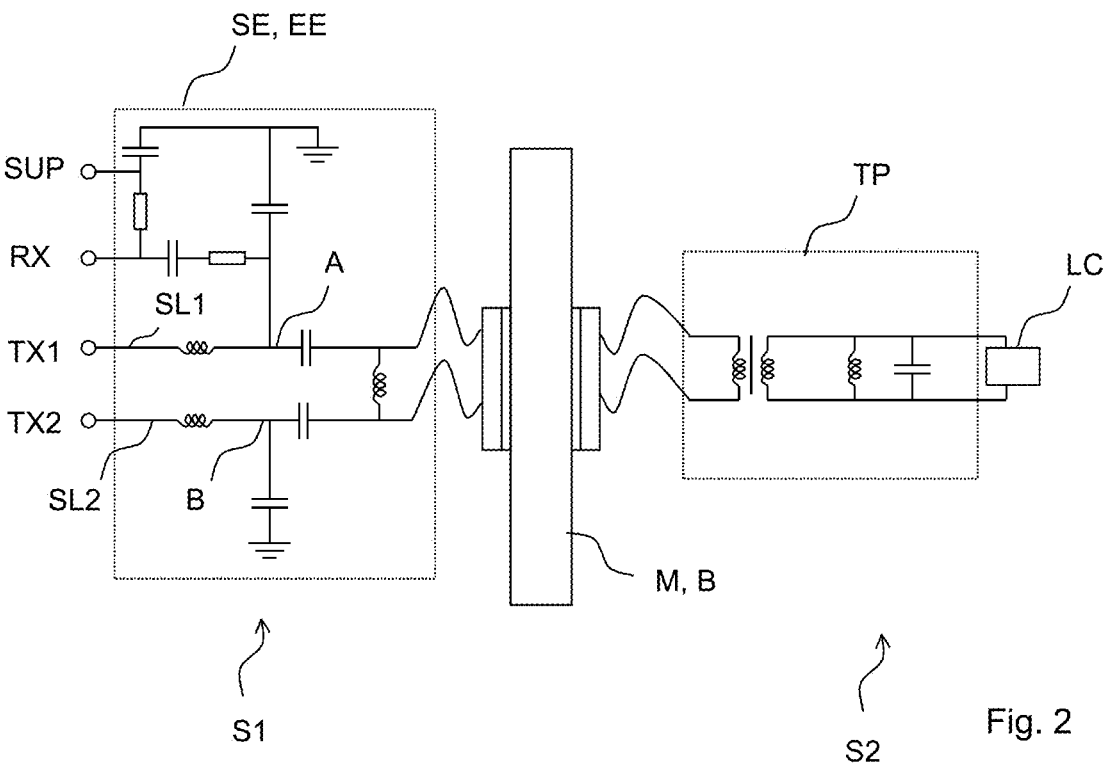
FIG. 2 shows possible circuit elements on the primary side and on the secondary side.

FIG. 2 shows a possible form of a primary side circuit combining elements of the transmitting unit SE and the receiving unit EE. The transmitting unit SE has a first signal line SL1 and a second signal line SL2. The first signal line SL1 connects a first transmitting terminal TX1 to an electrode of the electroacoustic transducer. The second signal line SL2 connects the second transmitting terminal TX2 to the second electrode of the electroacoustic transducer. The first transmit terminal TX1 and the second transmit terminal TX2 represent the two terminals of a balanced transmit signal port of the primary side circuit. The first and second signal lines each comprise a series connection of an inductive element and a capacitive element. The inductive element is connected between the input terminal and a node A and B, respectively. The capacitive element is connected between node A or between node B and the electrode of the electroacoustic transducer. Furthermore, an inductive element connects the two electrodes of the electroacoustic transducer.

Node B is connected to ground via a capacitive element. Node A is also connected to ground via a capacitive element. Furthermore, node A is connected to an unbalanced receive terminal RX via a series connection of a resistive element and a capacitive element. A resistive element is connected between a supply terminal SUP and the receive terminal RX. The supply terminal is connected to ground via another capacitive element.

On the secondary side, the electroacoustic transducer is connected to a transformer with two magnetically coupled inductive elements. The inductive element of the transformer, which is not directly connected to the electroacoustic transducer on the secondary side, is connected to a parallel circuit consisting of an inductive element, a capacitive element and the logic circuit LC.

An input signal can be received by the transmitting unit SE from an external circuit environment through the two terminals TX1, TX2. The signal is transmitted to the primary side electroacoustic transducer via the signal conductors SL1, SL2. Corresponding acoustic waves reach the secondary-side electroacoustic transducer and are converted by it into a secondary-side electrical signal. This is transformed to suitable voltage and current values by means of the secondary-side transformer and reaches the logic circuit LC. This allows the primary side to control the activity of the secondary side. A possible response signal is transmitted by the unit of secondary side transformer and transponder TP back to the primary side S1 and can be forwarded to the external circuit environment via the output port RX.

In this case, the primary-side circuit is suitable for supplying the secondary-side circuit with energy, for example by means of a continuously transmitted, substantially sinusoidal signal of the carrier frequency, so that the provision of additional energy stores, which would otherwise have to be replaced periodically, is not necessary on the secondary side.

Figure 3:
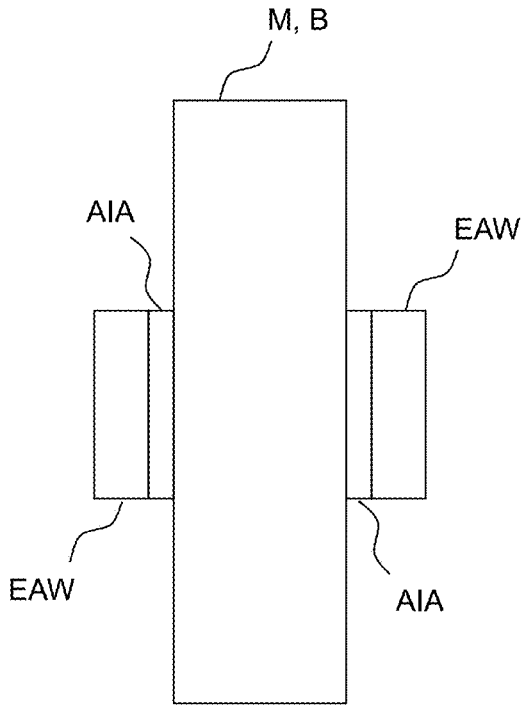
FIG. 3 shows a more detailed view of the acoustic channel.

FIG. 3 shows the elements of the acoustic channel. Between the two EAW electroacoustic transducers is the barrier B material, which serves as a medium for propagating the acoustic waves between the transducers. Each transducer is connected to the medium M via an acoustic impedance matching element AIA. The acoustic impedance matching element AIA can be an adhesive with suitable acoustic impedance.

It is advantageous to use as thin an adhesive layer as possible or none at all.

A special impedance matching between transducer and medium is possible but not necessary.

Rather, reflections can be used to advantage in signal transmission. Thus, a "too good" matching would not be desirable here at all.

Figure 4:
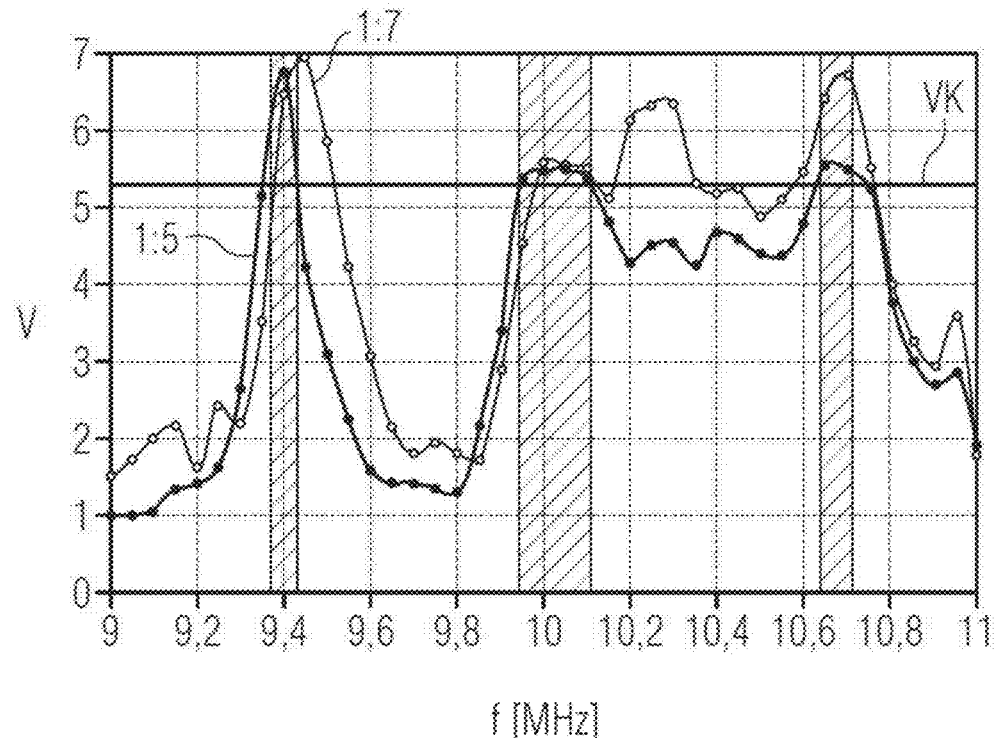
FIG. 4 shows a spectrum with advantageous frequencies.

FIG. 4 shows a frequency spectrum in which the signal strength of the response is plotted as a function of frequency for various transmission conditions in the transformer on the secondary side. VK represents a critical signal strength for the strength of the received signal, above which a reliable evaluation of the received signal is possible. It has been shown that for the material combination used, operating frequencies of 9.4 MHz, 10 MHz and 10.9 MHz are suitable for both transmission ratios of 1:5 and 1:7 in the transformer.

Figure 5:
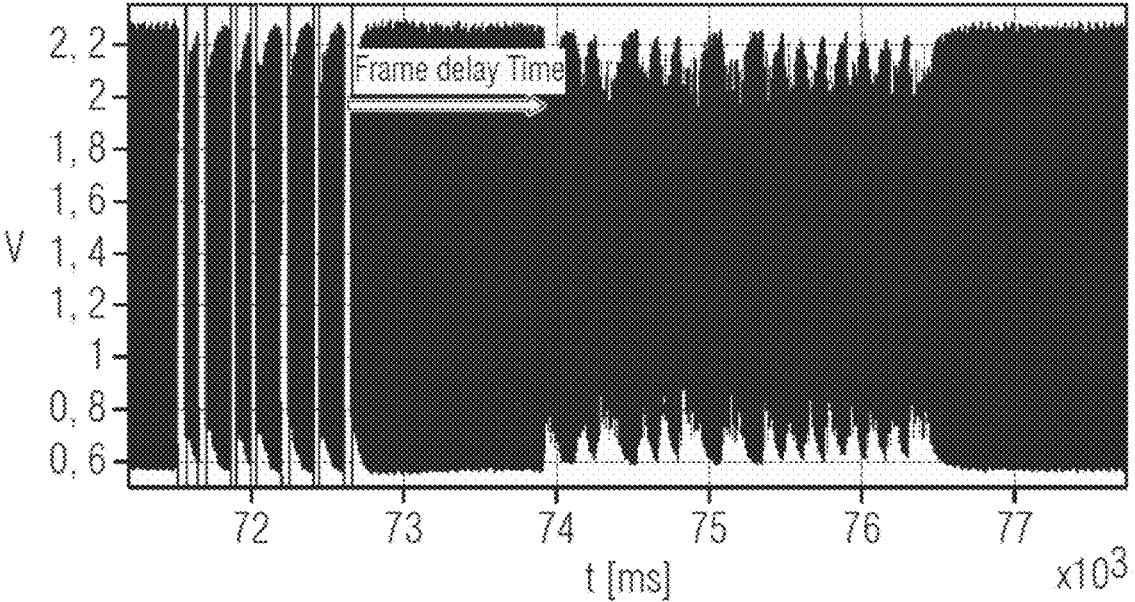
FIG. 5 shows the time course of the amplitude of a signal and its response.

FIG. 5 shows a possible amplitude curve for communication from the primary side to the secondary side and the corresponding response from the secondary side. The primary side uses six wave packets which are transmitted to the secondary side. After a certain waiting time (frame delay time), the secondary side responds with specific signals depending on the determined parameter value.

Figure 6:
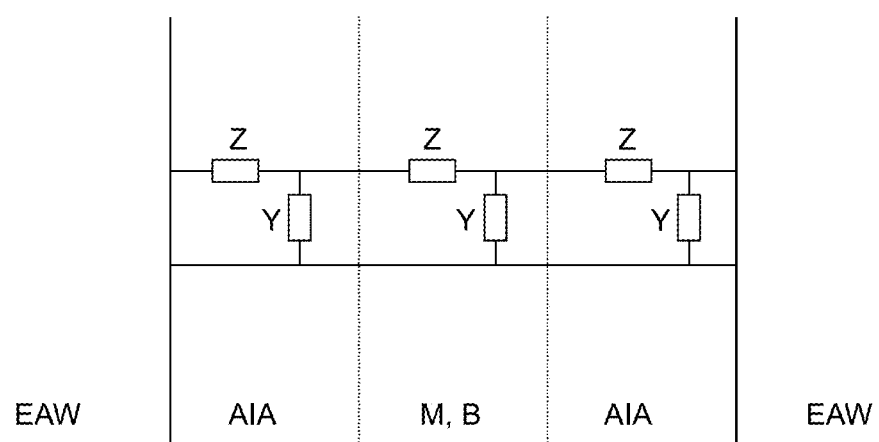
FIG. 6 shows a model of the acoustics of the acoustic signal.

FIG. 6 shows an analytical model of the acoustic signal, which can be used to reproduce the signal transmission. Each of the acoustically active elements between the EAW transducers (primary side acoustic impedance matching element, barrier medium, secondary side acoustic impedance matching element) can be described by complex impedance (Z) and admittance (Y) values. Depending on the impedance jump at interfaces between different materials, an effective reflection factor results, so that the materials are easily selectable, that a high degree of signal and energy transmission to the acoustic transducer is possible.

Figure 7:
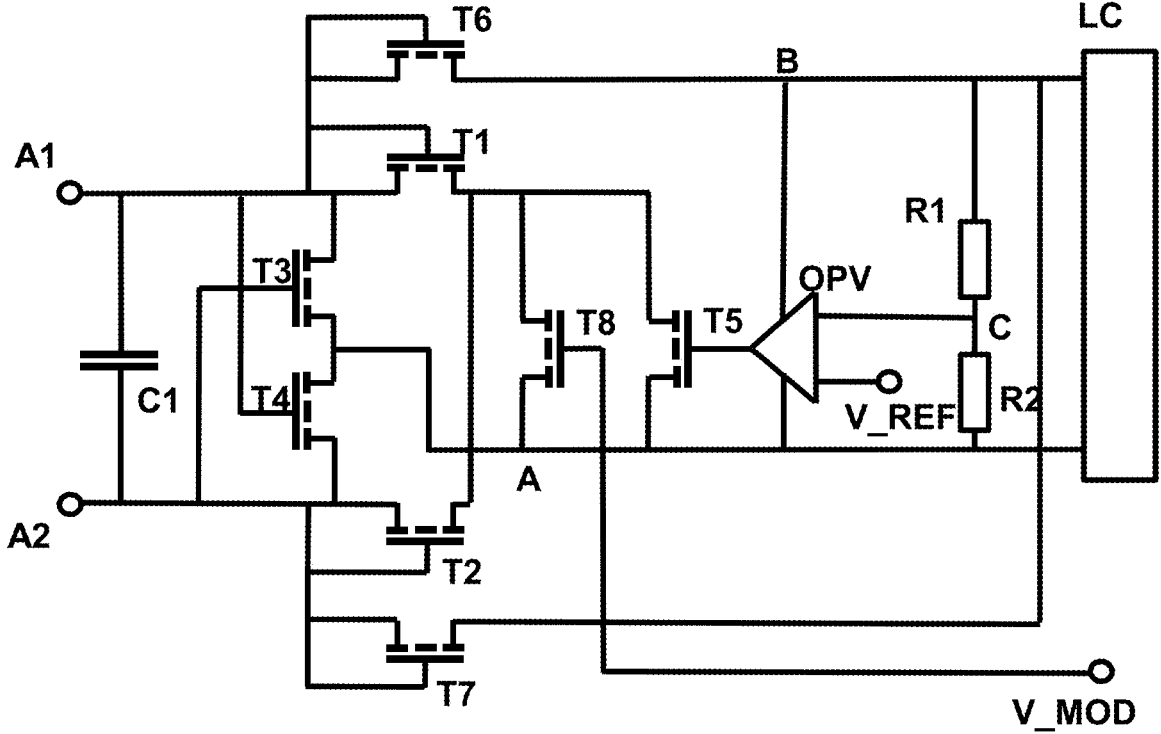
FIG. 7 shows a possible transponder front-end circuit.

FIG. 7 shows a possible embodiment of a transducer (i.e., transponder) front-end circuit that can be used on the secondary side between the electroacoustic transducer and the secondary-side logic circuit.

Transistors T1, T2, T3, T4, T5, T6 therein form a rectifier.

The circuit has a first input terminal A1 and a second input terminal A2 to receive the sinusoidal alternating signal of the carrier frequency of about 10 MHz, and an output terminal SUP to supply electrical power in the form of DC voltage and current to a logic circuit.

Furthermore, the circuit has four circuit nodes A, B, C, D. A capacitance between the terminals A1 and A2 represents unavoidable parasitic capacitance of the MOS transistors, as well as a capacitive element if necessary. The two transistors T3 and T4 represent switches that are controlled to be conductive or non-conductive by the voltage at their gate terminal (relative to the voltage at their source and drain terminals, respectively). Transistors T1 and T2, and transistors T6 and T7 are operated as so-called MOS diodes (gate terminal is connected to the drain terminal), i.e. their function is that of a diode. Altogether the construct results in a rectifier, which generates a DC voltage at the circuit nodes A and B, respectively also at A and D, where A represents the reference or the ground connection with 0 volts, and at B and D a voltage higher than A is formed.

To keep the DC voltage constant, a so-called voltage limiter is implemented. This consists of the operational amplifier and the transistor T5. The operational amplifier compares the DC supply voltage at point C, which is derived from the voltage at point B by a voltage divider consisting of resistors R1 and R2, with a constant voltage reference V_REF, e.g. a bandgap reference. This forms a control loop. As the AC input voltage between A1 and A2 increases, the output voltage of the op amp changes in such a way that transistor T5 becomes slightly more current conducting, i.e., its impedance between source and drain, which is at points A and D, becomes slightly lower impedance. This keeps the voltage at point B constant with respect to the reference (GND) at point A. A constant supply voltage is thus essential for the supply of the subsequent logic circuit, which has a time-variable current requirement during operation.

However, changing the impedance of transistor T5 also has an effect on the impedance applied between input terminals A1 and A2. Essentially, the voltage between A1 and A2 is also kept constant, even if the input current in A1 changes, e.g., becomes larger. This is equivalent to the input impedance between points A1 and A2 changing, depending on the regulation of transistor T5.

One can use this concept to generate load modulation. For this purpose, another transistor T8 can be used, which has its drain and source terminals in parallel with T5. The gate of T8 can now be modulated with a control voltage containing the data to be transmitted in the form of a channel coding (e.g. Manchester coding) on an auxiliary carrier frequency. The subcarrier frequency can be, for example, a frequency which is obtained by dividing the carrier frequency AC voltage between points A1 and A2, for example by dividing by factor 16 or factor 32. This subcarrier frequency can again be controlled by a data stream, e.g. in Manchester coding.

Figure 8:
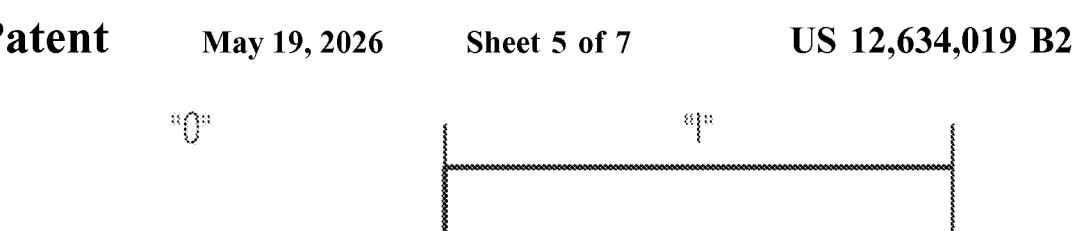
FIG. 8 shows time ranges and associated frequency ranges.
Figure 8:
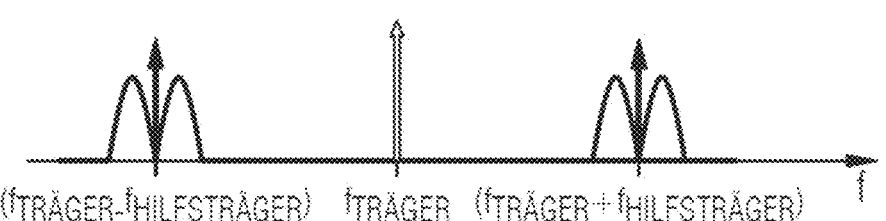

FIG. 8 shows usable signals in time and frequency domains, which result from appropriate transformations apart. Specifically, the upper part of the figure shows temporal progressions. The lower part shows associated frequency components.

In the upper part of FIG. 8, the top curve shows useful data bits for a certain time duration, specifically a zero, a one, and the transition in between. The next line shows the course of an associated channel coding. The third line shows the time history of the associated subcarrier. In the fourth line, the subcarrier modulated by means of the channel coding is shown. The last line of the upper part of FIG. 8 shows the carrier with load modulation.

The first line of the lower part of FIG. 8 represents the channel coding in the frequency domain. The second line of the lower part of FIG. 8 represents the modulated subcarrier in the frequency domain. The third line of the lower part of FIG. 8 represents the load modulation on the carrier.

I.e. via the suitably modulated subcarrier a doubling or—depending on the frequency spacing—quadrupling of transmission frequency ranges is possible. This improves interference immunity (e.g. in the case of interference by noise in the metal or interference by pronounced resonances in the metal, which statistically tend to occur only in one frequency range).

Figure 9:
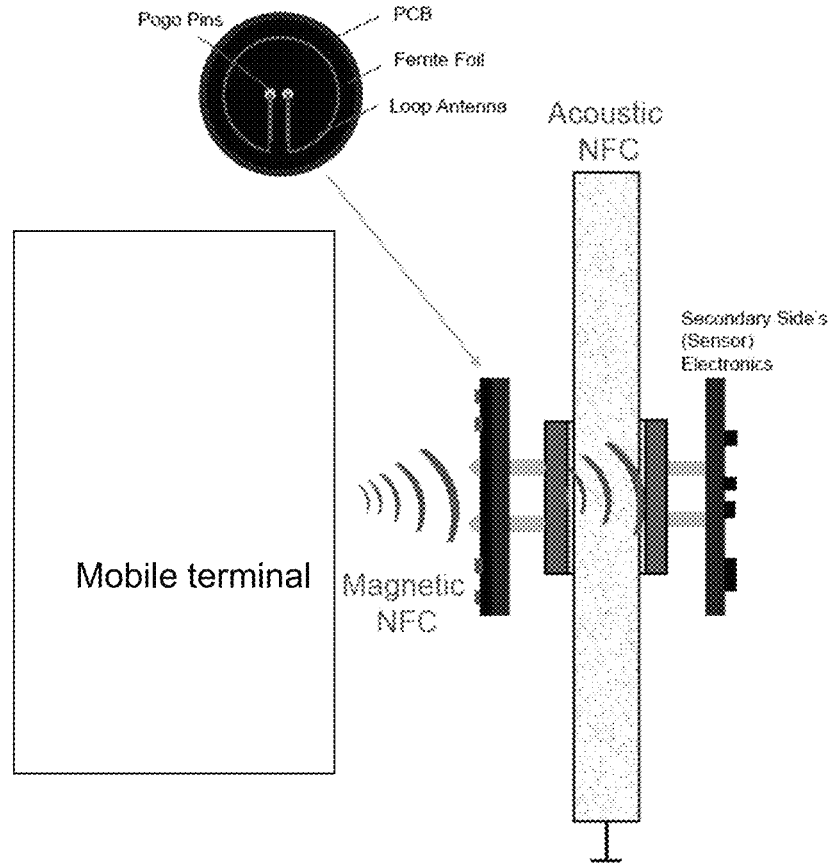
FIGS. 9 and 10 show possibilities for contactless communication between an external circuit environment and the primary.

FIG. 9 shows the elements of a form of transmission system in which a module with an air interface, specifically with an NFC (near field communication) interface, is provided on the primary side. This allows the primary side to be controlled in a contactless manner via a corresponding control device, e.g., a portable communication terminal such as a cell phone with corresponding control software. For this purpose, the module on the primary side has a printed circuit board with the corresponding electronic circuit components and an antenna. The antenna can be formed directly as metallization in the printed circuit board or on the printed circuit board.

This contactless connection of the primary side can be the only connection, or in addition to a connection via another connection, such as a cable. The contactless connection can practically be used to assign the ID number of individual primary pages in a system consisting of several primary pages to a position in the system.

Figure 10:
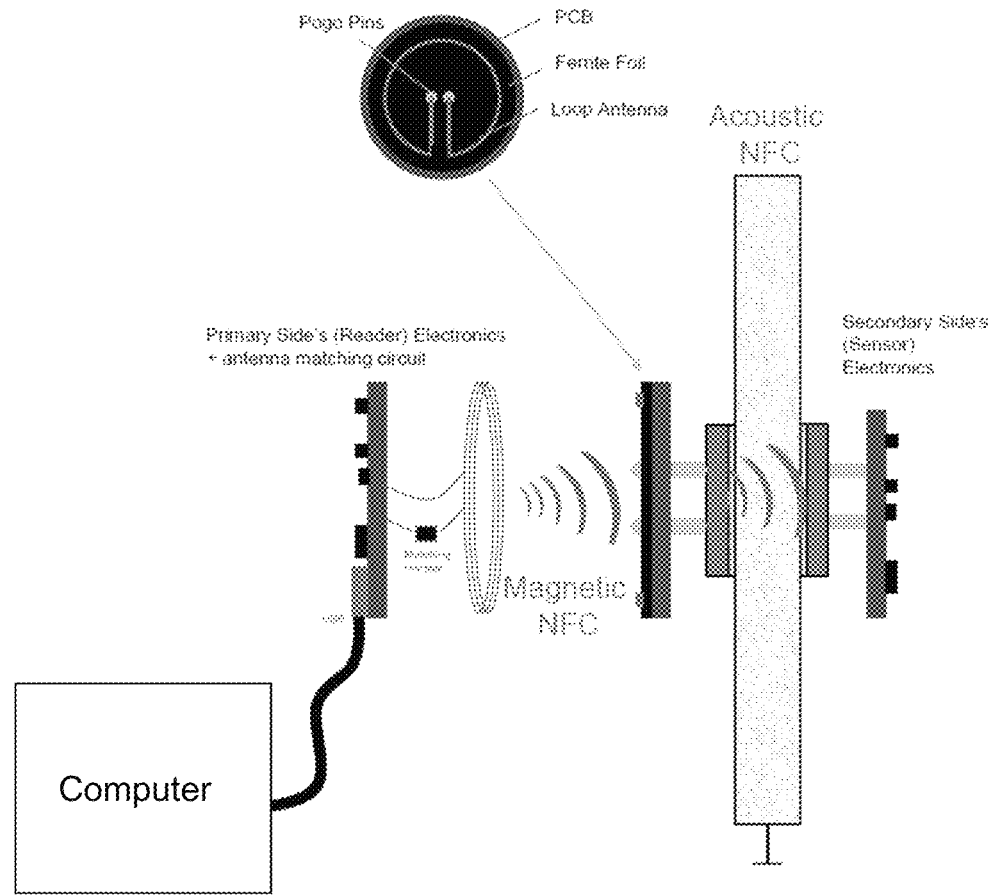

FIG. 10 shows a variation where the module on the primary side is controlled by another module. The additional module can be connected to an external logic circuit, e.g. a bus system of a computer. The further module then also contains the control elements for contactless communication with the primary-side module.

By means of the circuits and systems described above, it is possible easily and with little circuitry and power requirements on the secondary side to overcome barriers to communication by means of acoustic waves that are opaque to electromagnetic signals.

The invention claimed is:

1. An acoustic transmission system comprising:
   a primary side comprising:
      a transmitting unit configured to provide a transmit signal;
      a receiving unit configured to receive a receive signal in response to a transmitted signal; and
      an electroacoustic transducer configured to convert the transmit signal into an acoustic signal and an acoustic signal into the receive signal; and
   a secondary side comprising:
      a transponder configured to receive a receive signal and transmit a transmit signal; and
      an electroacoustic transducer; and
   a medium permeable to acoustic signals between the primary side and the secondary side,
   wherein elements of the secondary side are operable by energy transmitted from the primary side,
   wherein the primary side is configured to communicate with more than one secondary sides at the same time by using an anti-collision method
   to avoid an overlap of acoustic signals of different secondary side.

2. The acoustic transmission system according to claim 1, wherein the secondary side further comprises a sensor.

3. The acoustic transmission system according to claim 1, wherein the secondary side further comprises a logic circuit.

4. The acoustic transmission system according to claim 1, wherein the secondary side comprises a modulator or a MOSFET.

5. The acoustic transmission system according to claim 1, wherein the secondary side further comprises a modulator configured to modulate an electrical load on the electroacoustic transducer of the secondary side.

6. The acoustic transmission system according to claim 1, wherein the secondary side further comprises a rectifier.

7. The acoustic transmission system according to claim 6, wherein the rectifier is connected between the electroacoustic transducer and a modulator and/or is directly connected to the modulator.

8. The acoustic transmission system according to claim 1, further comprising a base of a transistor connected to a terminal (V_MOD) for load modulation.

9. The acoustic transmission system according to claim 8, wherein the transistor is a MOSFET.

10. The acoustic transmission system according to claim 8, further comprising a rectifier arranged between an electroacoustic transducer and the transistor, wherein a voltage across the electroacoustic transducer becomes non-zero when the transistor is short-circuited for the load modulation.

11. The acoustic transmission system according to claim 10, wherein, during the load modulation, a clock is derivable on the secondary side from an incoming acoustic wave with a carrier frequency from the primary side.

12. The acoustic transmission system according to claim 1, wherein the secondary side comprises an intermediate energy storage.

13. The acoustic transmission system according to claim 1, wherein the transponder is configured to use a clock as a system clock.

14. The acoustic transmission system according to claim 1, wherein the secondary side is free of an oscillator for back communication.

15. The acoustic transmission system according to claim 1, wherein the secondary side is free of an oscillator.

16. The acoustic transmission system according to claim 1, wherein the secondary side comprises an electrical impedance matching network.

17. The acoustic transmission system according to claim 1, wherein the secondary side comprises a frequency reducer.

18. The acoustic transmission system according to claim 1, wherein the secondary side comprises a circuit unit including a transformer and a parallel circuit comprising an inductive element, a capacitive element and a logic circuit.

19. The acoustic transmission system according to claim 1, wherein the secondary side comprises a logic circuit front end circuit having a port, a supply terminal, four circuit nodes, an operational amplifier and seven transistors.

20. The acoustic transmission system according to claim 1, wherein the primary side and/or the secondary side comprises an acoustic impedance matching and/or an electrical impedance matching.

21. The acoustic transmission system according to claim 1, wherein the primary side comprises a crossover.

22. The acoustic transmission system according to claim 1, wherein the primary side is configured to supply power to the secondary side.

23. The acoustic transmission system according to claim 1, wherein the acoustic transmission system is configured for unidirectional communication or bidirectional communication.

24. The acoustic transmission system according to claim 1, wherein the primary side comprises a matching network with two signal lines, a balanced guided input, an unbalanced guided output, a supply port, three inductive elements and 6 capacitive elements.

25. The acoustic transmission system according to claim 1, wherein the secondary side comprises means for recording and/or transmitting acoustic and/or optical perception.

26. The acoustic transmission system according to claim 25, wherein the secondary side comprises means for recording and/or transmitting audio recording, image recording, video recording, image-and-sound recording.

27. The acoustic transmission system according to claim 1, wherein information recorded on the secondary side is transmittable to the primary side in form of digital data.

28. The acoustic transmission system according to claim 1, wherein video information recorded on the secondary side is transmittable to the primary side as monochrome, grayscale or color image.

29. The acoustic transmission system according to claim 1, wherein audio information recorded on the secondary side is transmittable to the primary side as a mono or stereo signal.

30. The acoustic transmission system according to claim 1, wherein a beginning of a new image line is transmittable to an outside during transmission of an image or moving image.

31. The acoustic transmission system according to claim 30, further comprising means for transmitting the beginning of the new image line to the secondary side.

32. The acoustic transmission system according to claim 1, wherein 3 values per pixel are transmittable during transmission of a color image from the secondary side to the primary side.

33. The acoustic transmission system according to claim 1, wherein 3 values are transmittable per pixel during transmission of a color image from the secondary side to the primary side.

34. The acoustic transmission system according to claim 1, wherein each of the primary side and the secondary side comprises a circuit with a data frame size configured for transmitting and receiving information to be transmitted.

35. The acoustic transmission system according to claim 34, wherein the data frame size is 64 bytes.

36. The acoustic transmission system according to claim 1, wherein the primary side includes a module with an antenna or the primary side is expandable by a module with an antenna.

37. The acoustic transmission system according to claim 36, wherein the module is configured for communicating with an external communication device via an air interface connection.

38. The acoustic transmission system according to claim 37, wherein the external communication device is a mobile radio terminal.

39. The acoustic transmission system according to claim 38, wherein the primary side and/or the secondary side is controllable by the external communication device.

40. The acoustic transmission system according to claim 37, wherein the air interface comprises a connection via a transceiver of a wireless standard, an NFC connection, or a Bluetooth connection.

41. The acoustic transmission system according to claim 1, wherein the primary side comprises a transducer element, an energy storage device and a circuit for converting data between different transmission standards.

42. The acoustic transmission system according to claim 41, wherein the energy storage device is a battery or a rechargeable accumulator.

43. A method for communicating a signal between a primary side and at least two secondary sides, the method comprising:

transmitting, by a transmitting unit of the primary side, a carrier signal to a receiving unit of each of the secondary sides;

receiving, by the receiving unit, the carrier signal;

generating a response signal based on a measured value; and transmitting the response signal to the primary side, wherein the primary side communicates with more than one secondary sides at the same time by using an anti-collision method to avoid an overlap of acoustic signals of different secondary sides.

44. The method according to claim 43, wherein communication takes place unidirectionally or bidirectionally.

45. The method according to claim 43, wherein a data flow direction includes a direction from the primary side to the secondary side.

46. The method according to claim 43, wherein modulation is any one of modulations of sections 8 and 9 of ISO/IEC14443-2_2010.

47. The method according to claim 43, wherein the method comprises error detection or error correction methods.

48. The method according to claim 43, wherein data frames are sent from the primary side to the secondary side and are responded to by the secondary side.

49. The method according to claim 48, wherein between asynchronous data frames only a non-modulated carrier frequency is sent from the primary side to the secondary side.

50. The method according to claim 43, wherein between 8 bits of user data a parity bit is sent according to ISO/IEC14443-3_2011 standard.

51. The method according to claim 43, wherein transmission comprises a Cyclic Redundancy Check (CRC) mechanism.

52. The method according to claim 51, wherein the Cyclic Redundancy Check (CRC) is a CRC16 check or CRC32 check according to ISO/IEC14443-3_2011 standard, and wherein last 2×8 bits or 4×8 bits belong to a check, respectively.

53. The method according to claim 43, further comprising buffering energy on the secondary side.

54. The method according to claim 43, wherein longitudinal acoustic waves traverse a solid barrier.

55. The method according to claim 43, wherein communication is controlled by the primary side.

56. The method according to claim 43, wherein the primary side communicates with more than one secondary side.

57. The method according to claim 43, wherein the method communicates at frequencies in a range of 1 MHz to 50 MHz.

58. The method according to claim 57, wherein electroacoustic communication uses frequencies in a frequency range of 13.56 MHz±0.5 MHz.

59. The method according to claim 43, wherein elements of an acoustic channel between the primary side and the secondary side are adapted to a frequency range of 13.56 MHz±0.5 MHz.

60. The method according to claim 59, wherein the elements of the acoustic channel comprise electroacoustic transducers, adhesive layers and a medium.

61. The method according to claim 43, wherein the method comprises varying frequencies and/or amplitudes to compensate for changing environmental parameters or manufacturing tolerances.

62. The method according to claim 61, wherein the varying frequencies are oriented to digital data received by the primary side from the secondary side.

63. The method according to claim 62, wherein the secondary side first correctly receives a command from the primary side.

64. The method according to claim 63, wherein the secondary side subsequently informs the primary side about "good" or "bad" frequencies.

65. The method according to claim 64, wherein a separation into "good" and "bad" frequencies is based on a bit error rate.

66. The method according to claim 65, wherein no additional analog circuit elements are required and no evaluation of an amplitude level is necessary for classifying the frequencies into "good" and "bad" frequencies.

67. The acoustic transmission system according to claim 1, wherein the primary side is configured to emit acoustic signals into a barrier located between the primary side and the secondary side thereby penetrating the barrier and transmitting information and energy to the secondary side.

68. The acoustic transmission system according to claim 1, wherein the primary side is configured to emit the acoustic signal into a barrier located between the primary side and the secondary side thereby penetrating the barrier and transmitting information and energy to the secondary side.

69. The acoustic transmission system according to claim 1, wherein the acoustic transmission system is configured to transmit information by modulation selected from load modulation, phase modulation, amplitude modulation, frequency modulation, or complex modulation.

70. A method for using the acoustic transmission system according to claim 1, the method comprising:

providing a measured value in a volume which is hermetically and/or galvanically separated from the primary side.

71. The method according to claim 70, wherein providing comprises measuring a temperature, a gas pressure, a humidity, a pH value and/or pressure in liquid media.

72. The method according to claim 71, wherein providing comprises providing a galvanically isolated transmission to an outside in a high-voltage capacitor.

73. A method comprising:

using an error detection mechanism in the acoustic transmission system according to claim 1 for finding well-suited carrier frequencies, amplitudes and/or settings of a modulation.

74. A method according to claim 1, the method comprising:

using the acoustic transmission system for four or more acoustic frequency ranges in which the same information is transmitted.

75. The method according to claim 74, wherein a two-stage modulation method is used in a load modulation.

76. The method according to claim 75, wherein data in Manchester coding is modulated onto a subcarrier in a first operation, and wherein the subcarrier in a channel is modulated back onto a carrier frequency in a second operation.

77. The method according to claim 76, wherein the primary side always receives information of the secondary side at the same time and in parallel in four frequency bands, but which are fixed relative to the carrier frequency.

78. The method according to claim 77, wherein the information is always transmitted simultaneously in the four frequency bands.

79. An acoustic transmission system comprising:

a primary side comprising:

a transmitting unit configured to provide a transmit signal;

a receiving unit configured to receive a receive signal in response to a transmitted signal; and an electroacoustic transducer configured to convert the transmit signal into an acoustic signal and an acoustic signal into the receive signal;

a secondary side comprising:

a transponder configured to receive a receive signal and transmit a transmit signal; and an electroacoustic transducer; and a medium permeable to acoustic signals between the primary side and the secondary side, wherein the primary side and/or the secondary side comprises an acoustic impedance matching, and wherein each electroacoustic transducer is connected to the medium via an acoustic impedance matching element.

80. The acoustic transmission system according to claim 79, wherein elements of the secondary side are operable by energy transmitted from the primary side.

81. The acoustic transmission system according to claim 79, wherein the acoustic impedance matching element is an adhesive with an acoustic impedance.

82. A method for communicating a signal between a primary side and at least two secondary sides, the method comprising:

transmitting, by a transmitting unit of the primary side, a carrier signal to a receiving unit of each of the secondary sides;

receiving, by the receiving unit, the carrier signal;

generating a response signal based on a measured value; and transmitting the response signal to the primary side, wherein the primary side communicates with more than one secondary sides at the same time by using an anti-collision method to avoid signal an overlap of acoustic signals of different secondary sides.

83. The method according to claim 82, wherein the primary side and the secondary side are hermetically separated and/or separated by a barrier impermeable to electromagnetic signals.

84. The method according to claim 83, wherein communication is point-to-point encrypted.

85. The method according to claim 84, wherein the communication uses a cryptographic method.

86. The method according to claim 85, wherein data is encrypted so that its content is not accessible to a third party and/or is not selectively modifiable by a third party.

87. The method according to claim 82, wherein acoustic waves penetrate a barrier between the primary side and the secondary side and transmit information and/or energy.

88. The method according to claim 82, further comprising emitting, by the primary side, the acoustic signals into a barrier located between the primary side and secondary side thereby penetrating the barrier and transmitting information and energy to the secondary side.

89. The method according to claim 82, wherein information is transmitted by modulation selected from load modulation, phase modulation, amplitude modulation, frequency modulation, or complex modulation.

90. The method according to claim 82, wherein elements of the secondary sides are operable by energy transmitted from the primary side.

91. A primary circuit comprising:

a transmitting unit configured to provide a transmit signal;

a receiving unit configured to receive a received signal in response to the transmitted signal; and an electroacoustic transducer configured to convert the transmit signal into an acoustic signal and an acoustic signal into the receive signal, wherein a primary side comprises an acoustic impedance matching, and wherein the primary side is configured to be connected to a medium via an acoustic impedance matching element.

92. A primary circuit comprising:

a transmitting unit configured to provide a transmit signal;

a receiving unit configured to receive a received signal in response to the transmitted signal; and an electroacoustic transducer configured to convert the transmit signal into an acoustic signal and an acoustic signal into the receive signal, wherein the primary circuit is configured to communicate with more than one secondary side at the same time by using an anti-collision method to avoid an overlap of acoustic signals of different secondary sides.

93. A method comprising:

transmitting, by a transmitting unit of a primary side, a carrier signal to a receiving unit of a secondary side through a medium permeable to acoustic signals between the primary side and the secondary side;

receiving, by the receiving unit, the carrier signal;

generating a response signal based on a measured value; and transmitting the response signal to the primary side, wherein the primary side and/or the secondary side comprises an acoustic impedance matching, wherein each of the primary side and the secondary side comprises an electroacoustic transducer and each electroacoustic transducer is connected to the medium via an acoustic impedance matching element.

* * * * *